United States Patent [19]

Terashita

[11] Patent Number: 4,905,039
[45] Date of Patent: Feb. 27, 1990

[54] COLOR IMAGE EXPOSURE APPARATUS

[75] Inventor: Takaaki Terashita, Kanagawa, Japan

[73] Assignee: Fuji Photo Film Co., Ltd., Kanagawa, Japan

[21] Appl. No.: 296,723

[22] Filed: Jan. 13, 1989

[30] Foreign Application Priority Data

Jan. 14, 1988 [JP] Japan .................................. 63-6403
Jan. 14, 1988 [JP] Japan .................................. 63-6404

[51] Int. Cl.⁴ ........................ G03B 27/72; G03B 27/76
[52] U.S. Cl. ................................................. 355/35
[58] Field of Search ...................... 355/32, 35, 71, 88

[56] References Cited

U.S. PATENT DOCUMENTS

| | | | |
|---|---|---|---|
| 2,997,389 | 8/1961 | Boon | 355/32 |
| 3,536,402 | 10/1970 | Aston | 355/35 |
| 3,923,394 | 12/1975 | Frankiewicz | 355/32 X |
| 4,050,807 | 9/1977 | Barbieri | 355/32 |
| 4,129,372 | 12/1978 | Allgeier | 355/35 X |
| 4,189,227 | 2/1980 | Barbieri | 355/35 |
| 4,351,608 | 9/1982 | Coote et al. | 355/35 |
| 4,505,569 | 3/1985 | Seto et al. | 355/35 X |
| 4,522,485 | 6/1985 | Kamiya et al. | 355/71 X |
| 4,809,198 | 2/1989 | Terashita | 355/35 X |

Primary Examiner—Richard A. Wintercorn
Attorney, Agent, or Firm—Sughrue, Mion, Zinn, Macpeak & Seas

[57] ABSTRACT

A color image exposure apparatus with improved color reproducibility is disclosed. The improved color reproducibility has been achieved by using for exposure only those rays having a substantially uniform angle distribution relative to an optical axis. In order to perform exposure by the above rays, rays substantially parallel to the optical axis are caused to enter a filter coated with a dielectric multilayer film or, as an alternative, rays substantially parallel to the optical axis only are chosen from rays emitted through the filter. Since rays near an enlarging master lens are substantially parallel to the optical axis, an optical member coated with a dielectric multilayer film may be arranged in the vicinity of the master lens.

18 Claims, 15 Drawing Sheets

F I G. 12 (A)
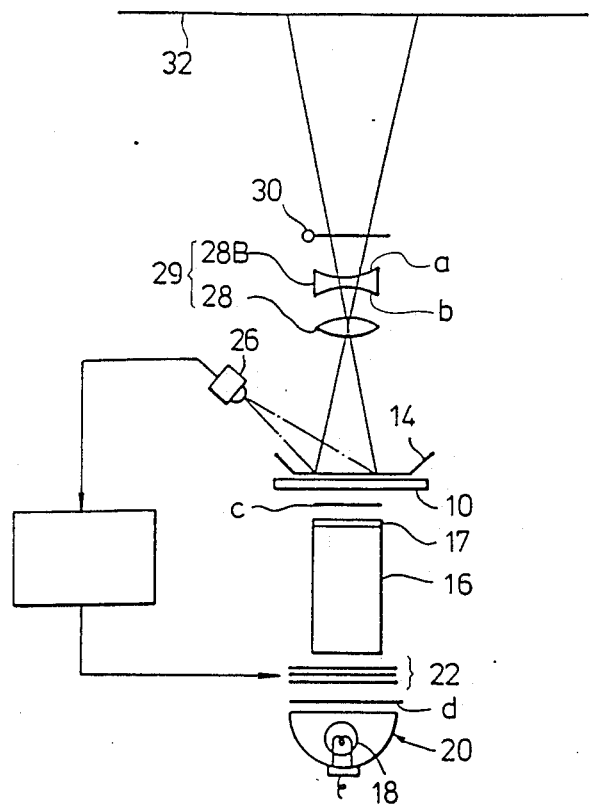

F I G. 13
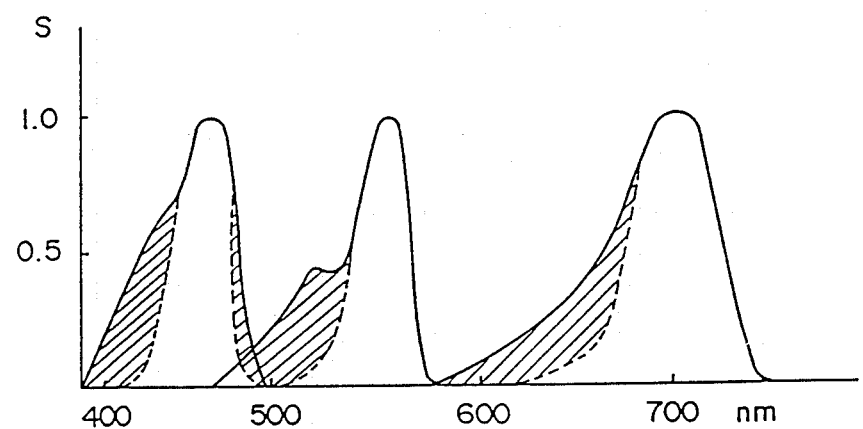

COLOR IMAGE EXPOSURE APPARATUS

BACKGROUND OF THE INVENTION (1) Field of the Invention

This invention relates to a color image exposure apparatus for forming a color positive from a color original by using a copying color-sensitive material which is generally employed for a color photograph printer, color copier or the like, especially, a copying color-sensitive material making use of a silver halide (hereinafter called "color paper").

(2) Description of the Related Art

For the control of exposure in a color copying machine, it is important to maintain in conformity the spectral sensitivity distribution of a light measuring system and that of an exposing system.

As apparatuses having the same spectral sensitivity distribution in both light measuring system and exposing system, there have been known color copying machines in which the spectral sensitivity distribution of a photoelectric transducer is made close to that of a copying sensitive material owing to the use of CdS as the photoelectric transducer in combination with a filter. A color photograph printer has also been proposed in which a trimming filter is inserted in an optical path between a light source and a photometer. The trimming filter permits transmission of rays of a high-sensitivity wavelength among the individual photosensitive ranges of blue(B), green(G) and red(R) sensitive layers of a color paper and cuts off rays of a low-sensitivity wavelength among the individual photosensitive ranges (Japanese Patent Application Laid-Open No. 64037/1978).

A filter, which cuts off rays in a particular wavelength band by either absorbing or reflecting them and permits transmission of rays of a wavelength shorter or longer than the wavelength band as described above, will hereinafter be called a band-stop filter (due to characteristics opposite to a band-pass filter).

However, the position suitable for the arrangement of such a filter, for example, a filter provided with a dielectric multilayer film is said to be any position between the light source and the color paper in the technique of Japanese Patent Application Laid-Open No. 64037/1978 referred to above. This arrangement however involves the potential problem that some characteristics of the filter provided with the dielectric multilayer film may be impaired by a wavelength shift caused by heat or at a certain incident angle. In this respect, similar inconvenience is also encountered in the technique disclosed in Japanese Patent Application Laid-Open No. 113627/1976. Although the spectral distribution of a filter provided with a dielectric multilayer film varies depending on the position of its arrangement, this variation may be divided into two aspects, one permitting its compensation by predicting the degree of the variation in advance and designing the characteristics of a filter with the prediction in mind and the other hardly permitting such a compensation. It is indispensable to obtain precise spectral characteristics for drawing out suitable effects of a filter provided with a dielectric multilayer film. An appropriate optical system including a filter provided with a dielectric multilayer film is required for this purpose.

FIG. 2 diagrammatically illustrates results of an experiment on the relative energy distribution of color light around a color paper when a color-light limiting filter coated with a dielectric multilayer film is arranged at a predetermined point between a light source and the color paper. The diagram is drawn on an enlarged scale to show the relative energy distribution around 500 nm.

Curve A in FIG. 2 is a characteristic curve obtained when a color photograph printer was constructed without a diaphragm mechanism 40 of FIG. 4 and a BG limiting filter a and an infrared cutoff filter d were interposed between a lamp house 20 and a light diffuser box 16 to provide a dielectric multilayer film having characteristics of FIG. 15. As will be appreciated from a comparison between the characteristic diagram of FIG. 15 and curve A of FIG. 2, a wavelength shift of about 20 nm took place toward the shorter wavelength side in the above case. Further, the difference in transmittance between the reflected band and the transmitted band was reduced so that the effects of the BG limiting filter a were reduced significantly. As a result, coupled with the wavelength shift toward the shorter wavelength side, the sensitivity of the blue sensitive layer was lowered.

In the trimming filter disclosed in Japanese Patent Application Laid-Open No. 64037/1978, the improved color reproducibility has been obtained as a secondary effect by cutting off both ends of the spectral sensitivity distribution of a color paper. However, spectral characteristics of each pigment in a color paper are not taken into consideration at all. In addition, the color reproducibility cannot be improved under such conditions that cutoff of spectral rays is conducted to such an extent as to not cause any drop in the second sensitivity peak on the side of wavelengths longer than the inherent sensitivity peak of the blue sensitivity. It is hence difficult to simultaneously realize both effects, namely, conformance of spectral sensitivity distribution and improvements in color reproducibility under conditions where the sensitivity reduction is small.

FIG. 3 illustrates average density distributions of pigments of the three primary colors of Y(yellow), M(magenta) and C(cyan) when the mask density of a color negative film has been removed. As shown in FIG. 3, the spectral distributions of the individual pigments overlap. It has been known that the color reproducibility of a color print deteriorates as the densities of the overlapped parts become higher. For confirmation of this, film pigments C,M,Y may be represented in terms of printing density ratios (pigment color mixing ratios) of R, G and B respectively as shown in Table 1.

TABLE 1

| Printing density | Pigment | | |
| --- | --- | --- | --- |
|  | C | M | Y |
| R density (Dr) | 1.00 | 0.09 | 0.00 |
| G density (Dg) | 0.06 | 1.00 | 0.23 |
| B density (Db) | 0.00 | 0.11 | 1.00 |

Here, the printing densities (Dr,Dg,Db) of the respective colors can be obtained in accordance with the following formula:

$$D(i) = -\log \frac{(J\lambda \cdot T_j\lambda \cdot S_i\lambda d\lambda)}{(J\lambda \cdot S_i\lambda d\lambda)}$$

where
    $J\lambda$: Spectral luminance distribution
    $Si\lambda$: Relative sensitivity distribution of a photosensitive layer i of a color paper $T_j\lambda$: Spectral transmittance distribution of pigment j of a color film i: One of red, green and blue j: One of cyan, magenta and yellow As is understood from Table 1, the printing density of a green sensitive layer for the yellow pigment is 0.23 while the printing density of the blue sensitive layer for a magenta pigment is 0.11. These printing densities are much higher compared to the printing density for the magenta pigment itself (R printing density: 0.09) or that for a cyan pigment (G printing density: 0.06). This can be attributed primarily to the inclusion of a high secondary photosensitive range at 490-520 nm of the green sensitive layer. The M band of a G sensitization pigment is absorbed in the secondary photosensitive range. This secondary photosensitive range is a photosensitive range which exists on the wavelength side shorter that that corresponding to the maximum sensitivity. Moreover, the use of a filter provided with a dielectric multilayer film is indispensable to practise the conventional technique. In such a case, unless the heat of the light source and the incident angle of light to the filter are suitably controlled, desired characteristics cannot be obtained, and when they are not appropriate, the use of such a filter may result in deleterious effects on the contrary.

SUMMARY OF THE INVENTION

With the foregoing in view, an object of the present invention is to provide a color image exposure apparatus which can improve the color reproducibility without any substantial reduction of the sensitivity of a copying color-sensitive material.

Another object of this invention is to provide a color image exposure apparatus having an optical system which can improve the color reproducibility without any substantial reduction of the sensitivity of a copying color-sensitive material such as a color paper and can also maintain in precise conformity the spectral sensitivity distribution of the copying color-sensitive material and that of a light measuring system of the exposure apparatus thereby to permit accurate measuring of light and precise exposure.

In one aspect of this invention, there is thus provided a color image exposure apparatus for obtaining a color picture from a color original. The apparatus comprises a color-light limiting means arranged in an optical path of light emitted from a light source and provided with a dielectric multilayer film for limiting color light around at least a wavelength band in which a blue light wavelength range and a green light wavelength range overlap, an exposure control means having yellow, magenta and cyan color-light control filters for color light which has transmitted through or has been reflected by the color-light limiting means and has transmitted through or has been reflected by the color original, said filters being inserted in the optical path to control the exposure of each of three primary-color-sensitive layers in a copying color-sensitive material, and a guide means for irradiating, as copying light, only those rays having an angle in a predetermined range relative to an optical axis of the light source out of rays transmitted through or reflected by the color-light limiting means provided with the dielectric multilayer film.

Owing to the provision of the guide means, light to be irradiated onto the color original or the copying color-sensitive material consists of those rays having an angle in the predetermined range relative to the optical axis of the light source out of rays transmitted through or reflected by the color-light limiting means. It is hence possible to reduce deleterious effects such as a wavelength shift to the incident angle of the light. The spectral sensitivity distribution of the copying color-sensitive material and that of the photometer can therefore be maintained in precise conformity, whereby the color reproducibility can be improved with only a little reduction of the sensitivity of the copying color-sensitive material.

In another aspect of this invention, there is also provided a color image exposure apparatus for obtaining a color picture from a color original. The apparatus comprises a color-light limiting means arranged in an optical path of light emitted from a light source, an exposure control means for inserting color-light control filters into the optical path in accordance with measurement data of color light which has been transmitted through or has been reflected by the color-light limiting means and has been transmitted through or has been reflected by the color original, whereby the light is irradiated through a lens onto a copying color-sensitive material to control the exposure of each of three primary-color-sensitive layers in the copying color sensitive material, and an optical member coated with a dielectric multilayer film for cutting off rays in a particular wavelength band of a visible range and arranged in the vicinity of the lens.

Owing to the arrangement of the band-stop dielectric multilayer film capable of cutting off rays in the particular wavelength band of the visible range, namely, a dielectric multilayer film capable of absorbing rays in both a short wavelength end and a long wavelength band in the vicinity of the lens, the secondary sensitivity—which exists over a relatively wide wavelength range on the side of shorter wavelengths than the maximum sensitivity and is indicated by hatching in FIG. 13—and unnecessary sensitivity of the copying color-sensitive material are reduced significantly so that the spectral sensitivity of the copying color-sensitive material is modified to successfully improve its color reproducibility. It is also possible to reduce the area of the dielectric multilayer film, thereby making it possible to prevent coating irregularity. Incidentally, the term "unnecessary sensitivity" as used herein means sensitivity for one or more wavelength bands which are not absolutely necessary for the reproduction of a color or an image.

It has heretofore not been known to arrange such a band-stop dielectric multilayer film in the vicinity of a lens. By arranging it as in the present invention, the incident angles of rays to the dielectric multilayer film are reduced relative to the optical axis so that the rays become close to parallel rays. As a result, the wavelength shift depending on the incident angle is reduced and moreover, no heat-induced wavelength shift takes place owing to the long distance from the light source.

As has been described above, the color image exposure apparatus according to this invention can control small the incident angles of rays to a filter so that the effective spectral sensitivity distribution can be rendered appropriate with high accuracy without development of color irregularity. As a result, the apparatus has excellent advantages such that the sensitivity characteristics of a copying color-sensitive material are not modified too much, the color reproducibility has been improved, and the apparatus can be manufactured at a rather low cost and can be easily incorporated in conventional machines.

The apparatus has additional advantages that the effective spectral sensitivity distribution of the copying color-sensitive material and the spectral sensitivity distribution of the light measuring system of the exposure apparatus can be maintained in exact conformity and any inconvenient spectral distribution of the light regulation filter can be corrected, namely, precise measurement of light, accurate exposure and precise color reproduction can be realized.

BRIEF DESCRIPTION OF THE DRAWINGS

FIG. 12(A) is a simplified schematic view of a color photograph printer according to another embodiment of this invention;

FIG. 13 is a characteristic diagram of the spectral sensitivity distribution of a color paper;

DESCRIPTION OF THE PREFERRED EMBODIMENTS

Figure 1:
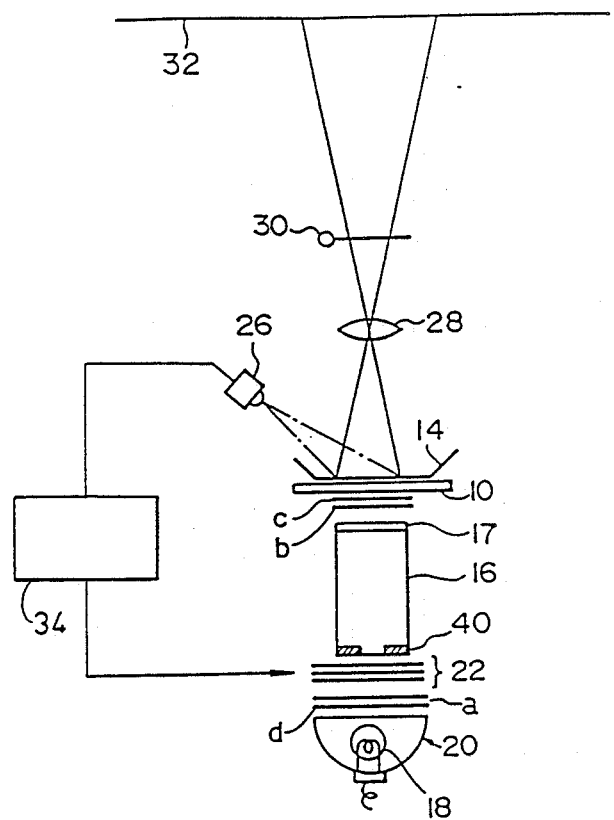
FIG. 1 is a simplified schematic view of a color photograph printer according to one embodiment of this invention.
Figure 14:
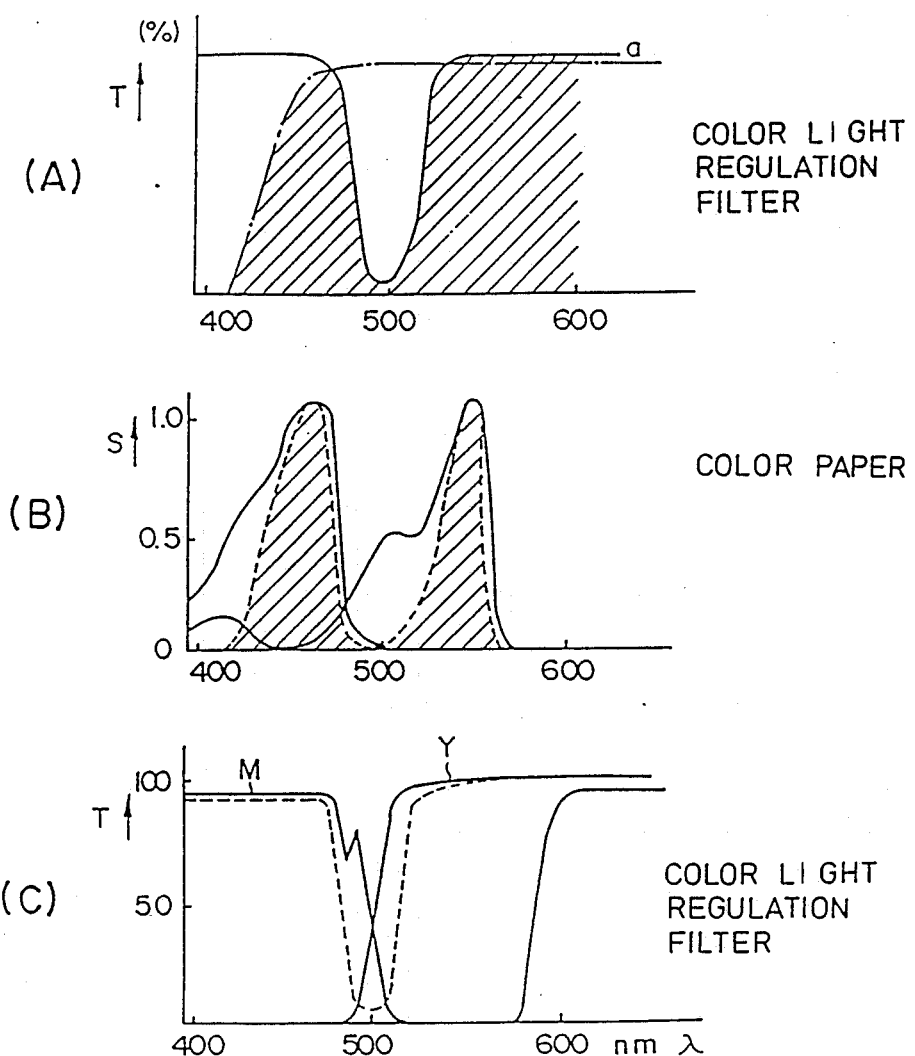
FIGS. 14(A), 14(B) and 14(C) are characteristic diagrams respectively illustrating the transmittance of the color-limiting dielectric multilayer film, color paper and light regulation filter as a function of wavelengths.

The color photograph printer illustrated in FIG. 1 is useful in printing the image of a color negative film on a color paper. Below a negative film 14 which has been carried to a printing zone while being mounted on a negative film carrier 10, a light diffuser box 16 and lamp house 20 provided with a halogen lamp 18 are arranged in order. The light diffuser box 16 is covered at the top thereof by a light diffuser plate, for example, an opal glass plate 17. Arranged above the opal glass plate 17 are a GR-limiting filter b out of color-light limiting filters as color-light limiting means as well as an ultraviolet cutoff filter c. The GR-limiting filter b serves to limit G-sensitive long wavelength rays and R-sensitive short wavelength rays. Arranged in front of the lamp house 20 are a BG-limiting filter a, which limits B-sensitive long wavelength rays and G-sensitive short wavelength rays, and an ultraviolet cutoff filter d. As the BG-limiting filter a, it is possible to use a filter having the characteristics of FIG. 14(4) which will be described subsequently.

A light regulation filter 22 is arranged between the lamp house 20 and the light diffuser box 16 and as has been known well, is composed of three filters, i.e., Y(yellow) filter, M(magenta) filter and C(cyan) filter. The color-light limiting filter can be formed of at least one filter provided with a band-stop dielectric multilayer film. In the present embodiment, there are two color-light limiting filters coated with a band-stop dielectric multilayer film, namely, the BG-limiting filter a for limiting rays of B-sensitive long wavelengths and those of B-sensitive short wavelengths and the GR-limiting filter b for limiting rays of G-sensitive long wavelengths and G-sensitive short wavelengths. The color-light limiting means is constructed of the BG-limiting filter a and GR-limiting filter b in combination with the ultraviolet cutoff filter c and infrared cutoff filter d. In the color-light limiting means, B-light is formed by the combination of the ultraviolet cutoff filter c and the BG-limiting filter a, G-light is formed by the combination of the BG-limiting filter a and GR-limiting filter b, and R-light is formed by the combination of the infrared cutoff filter d and GR-limiting filter b. So long as the R-, G- and B-lights thus formed have a narrow spectral distribution, it is possible to easily achieve conformance in spectral sensitivity distribution between the light-measuring system and the exposure system because they use the R-, G- and G-lights commonly. Incidentally, it is not always required to use two types of band-stop color-light limiting filters at the same time. Although the effects of this invention may be reduced partly in such a case, the overall effects are still greater than any conventional techniques. It is also feasible to compensate the thus-reduced effects by other means.

As the dielectric multilayer film coated on the BG-limiting filter a in this embodiment, it is possible to use, for example, alternate $TiO_2$ and $SiO_2$ layers coated as several tens of layers by vacuum deposition.

Figure 4:
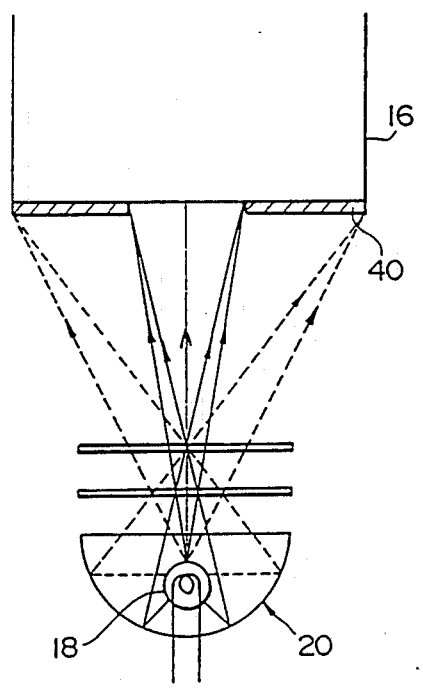
FIG. 4 is an enlarged fragmentary view of the printer of FIG. 1, in which a diaphragm mechanism has been applied to a guide means.
Figure 5:
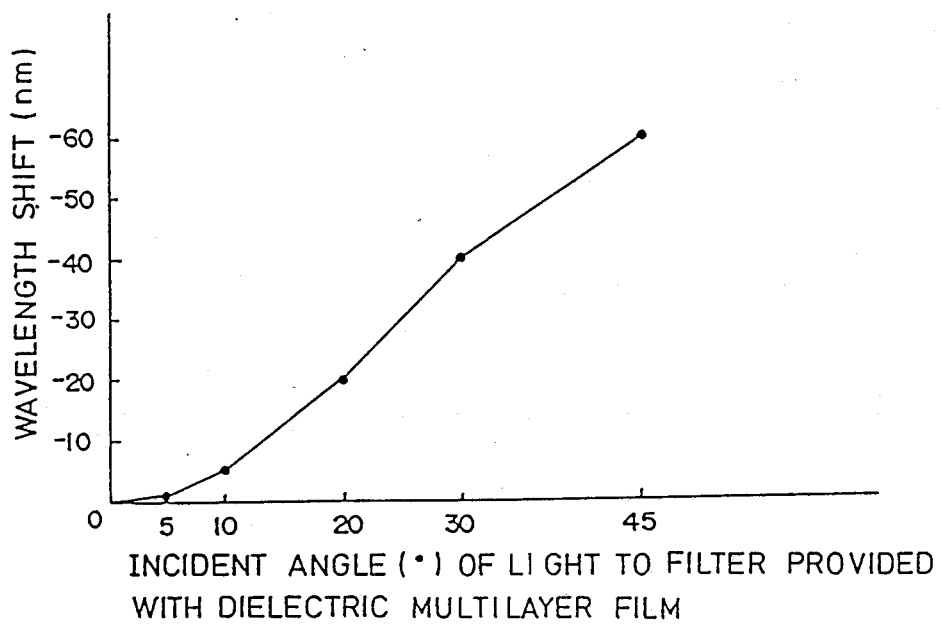
FIG. 5 is a characteristic diagram depicting the relationship between incident angles of light to the dielectric multilayer film and their corresponding wavelength shifts.

The light diffuser box 16 is provided at an end facing the lamp house 20, namely, at the lower end as viewed in FIG. 1 with a diaphragm mechanism 40 as a guide means. This diaphragm mechanism 40 is depicted on an enlarged scale in FIG. 4. The diaphragm mechanism 40 serves to prevent entrance of those rays, which have an incident angle of at least a predetermined angle, for example, 15° out of rays entered the BG-limiting filter a of the color-light limiting means, into the light diffuser box 16. Namely, among rays composed in combination of rays transmitted directly fro the halogen lamp 18 and those reflected by the inner mirror surface of the lamp house 20, those rays indicated by a dashed line in FIG. 4 are excluded and only those designated by a solid line are used to control the exposure. Rays with a limited incident angle hardly undergo a wavelength shift (see FIG. 5). FIG. 5 shows the relationship between the incident angle of light to a dielectric multilayer filter and the degree of its corresponding wavelength shift. It is appreciated that the wavelength shift becomes greater as the incident angle increases. Although no substantial deleterious effects such as a wavelength shift take place so long as the predetermined angle is not greater than 25°, it is preferred that most of rays has an incident angle not greater than about 15°.

A two-dimensional color image sensor 26 is arranged in a direction oblique relative to the optical axis of the focusing optical system and at a point permitting measurement of the density of the image of the negative film 14. B-filter, G-filter and R-filter are provided on the front face of the two-dimensional color image sensor 26. By exposing the two-dimensional color image sensor 26 to rays which have transmitted through the color-light limiting means, the spectral sensitivity distribution of the light-measuring system and that of the exposure system can be brought into conformity. By the way, the present embodiment is not necessarily limited to the use of the two-dimensional color image sensor 26. It is possible to use, for example, a photometer which measures the large area transmittance density (LATD) of each negative film. This secondary image sensor 26 is connected to an exposure controller 34 which adjusts the exposure by controlling the light regulation filter 22.

Arranged in order above the negative film 14 are a lens 28, a black shutter 30 and a color paper 32. Light which has transmitted through the light regulation filter 22, light diffuser box 16 and negative film 14 subsequent to its emission from the lamp house 20 is focused on the color paper 32 by the lens 28. Incidentally, a copying color-sensitive material of the silver halide type is used as the color paper 32 in this embodiment.

Figure 15:
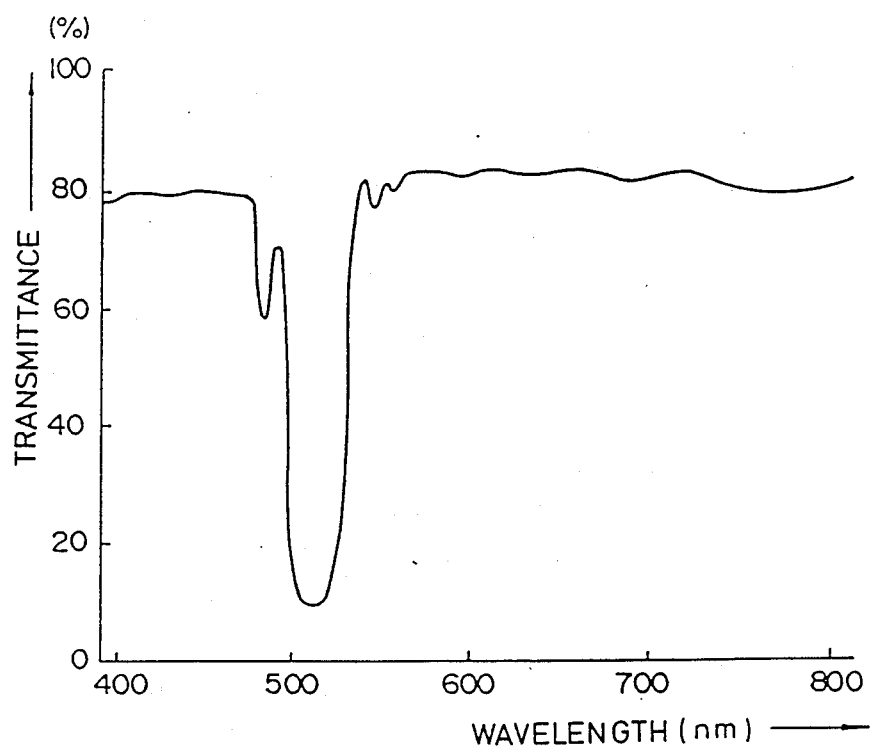
FIG. 15 depicts in detail the absorption band of a BG-limiting dielectric multilayer film.

FIG. 15 shows in detail an exemplary transmittance curve at short and long absorption wavelength ends which constitute absorption bands of the BG-limiting filter a. As depicted in FIG. 15, the fall-starting wavelength in the short absorption wavelength end is about 470 nm, while the rise-ending wavelength in the long absorption wavelength end is approximately 530 nm. The transmittance change ΔT is as much as 40% or even greater per 10 nm. As a result, the peak of the blue sensitivity and that of the green sensitivity are not reduced so that they can be separated without failure.

The operation of this embodiment will be described hereinafter.

When light emitted from the halogen lamp 18 passes first of all through the infrared cutoff filter d and BG-limiting filter a which constitute the color-light limiting means, rays of a wavelength in the predetermined wavelength band are cut off. The rays which have transmitted through the infrared filter d and BG-limiting filter a then reach the light diffuser box 16. By the diaphragm mechanism 40 provided at the incident end of the light diffuser box 16, rays having an incident angle greater than a predetermined value, for example, rays indicated by a dashed line in FIG. 4 are prevented fro entering the light diffuser box 16 and only the rays indicated by a solid line are guided into the light diffuser box 16. Namely, rays formed in combination of rays transmitted directly from the halogen lamp 18 and those reflected by the inner mirror surface of the lamp house 20 have a wide distribution of incident angles to the infrared cutoff filter d and BG-limiting filter a, and contain those having a large incident angle and giving deleterious effects (caused by a wavelength shift) to the improvement of the color reproducibility. Such rays are excluded by the diaphragm mechanism 40.

Figure 6:
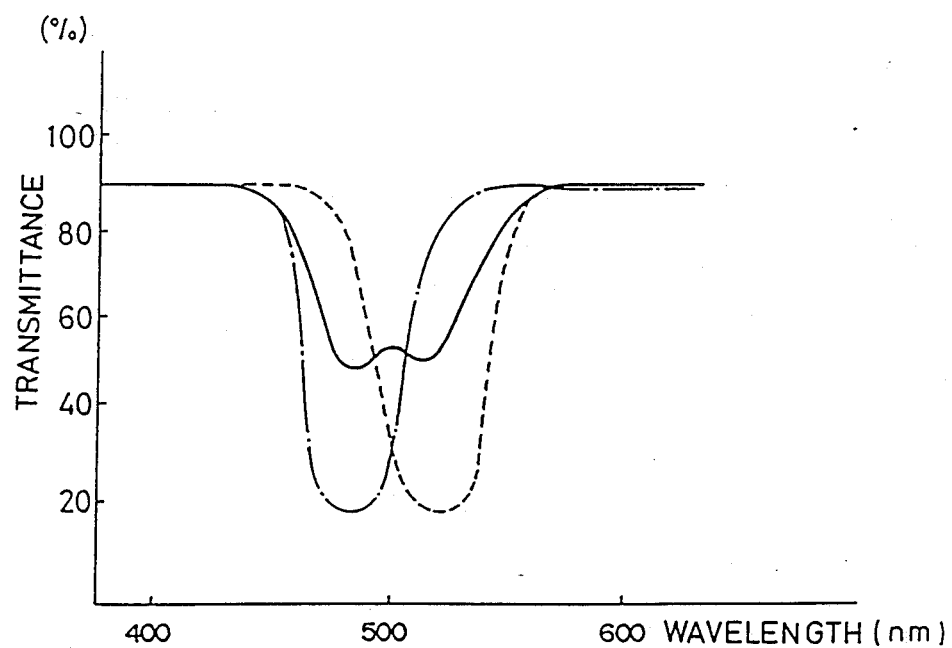
FIG. 6 is a characteristic diagram showing variations in transmittance depending on differences in the incident angle of light to the dielectric multilayer film.

Here, as is illustrated in FIG. 5, the relationship between the incident angle of light to the filter with the dielectric multilayer film vacuum-deposited thereon is such that a smaller incident angle results in a smaller wavelength shift. Since rays whose incident angles to the filter with the dielectric multilayer film vacuum-deposited thereon are at least 15° are excluded, wavelengths shifts can be prevented. Variations in band-stop region depending on differences in incident angle are illustrated in FIG. 6. The incident angle which gives the characteristic indicated by the dash-dot line in FIG. 6 is 30° smaller (−30°) relative to the incident angle corresponding to the characteristic indicated by the dashed line. As is envisaged from FIG. 6, where the difference in incident angle is 30°, there is a wavelength shift of about 40 nm. Further, light formed of a 1:1 mixture of rays whose incident angles differ by 30° has the above-described two characteristics, whereby broad absorption takes place and the function as a band-stop filter (color-light cutoff effect) is reduced.

Figure 2:
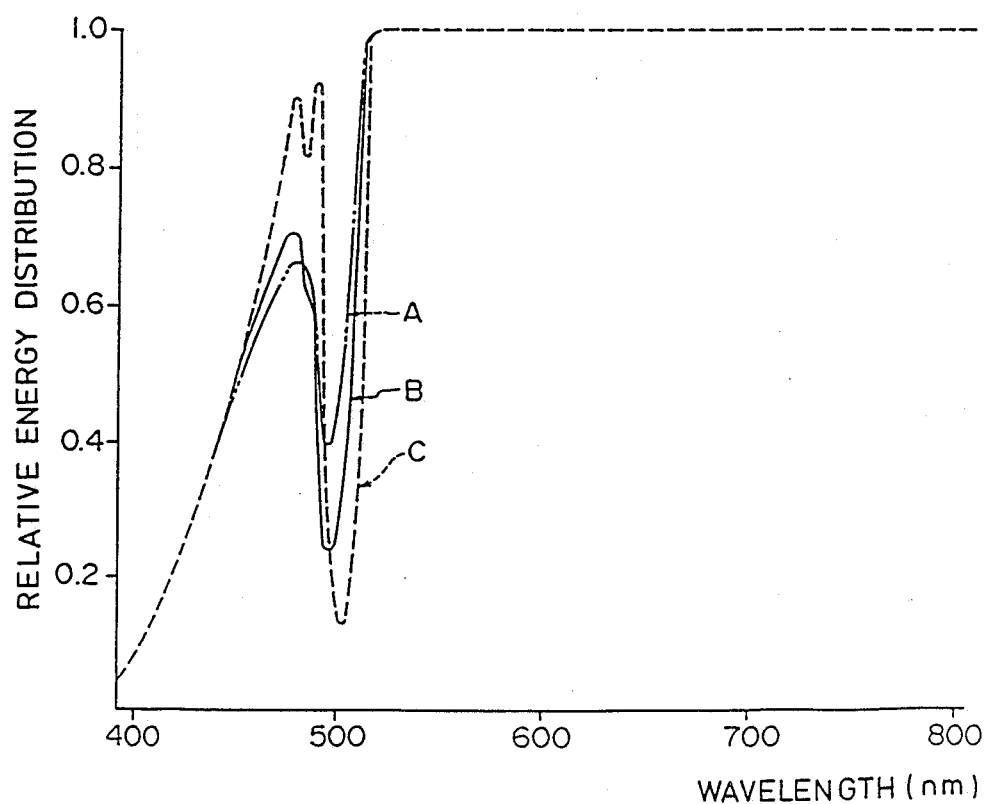
FIG. 2 is a characteristic diagram illustrating, in a comparative form, wavelength shifts depending on differences in the location of a color-light limiting filter coated with a dielectric multilayer film and differences in the type of a light source.
Figure 3:
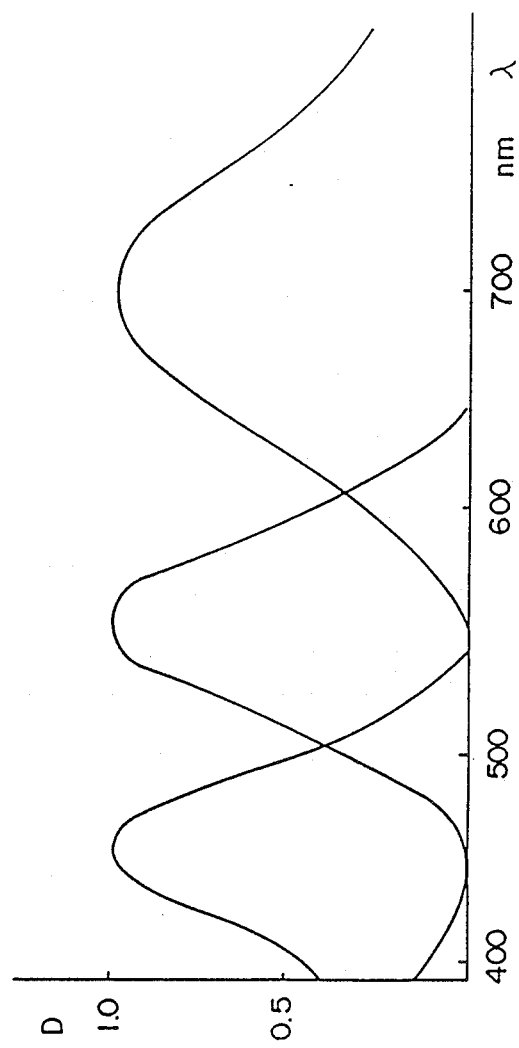
FIG. 3 is a characteristic diagram showing average relative spectral densities of individual pigments Y,M,C when the mask density of a color film has been removed.
Figure 11:
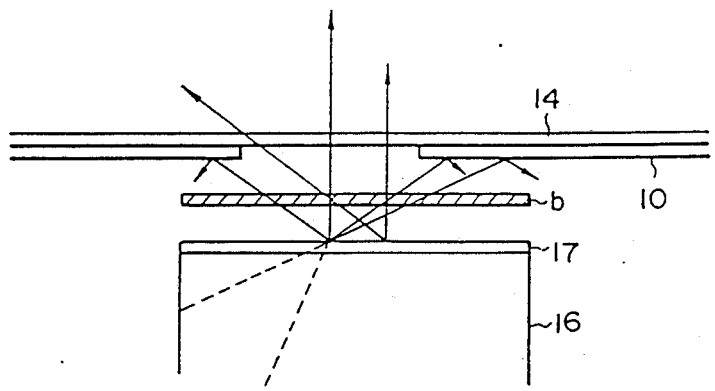
FIG. 11 is an enlarged fragmentary view of the printer of FIG. 1, in which a dielectric multilayer film has been arranged between a diffuser plate and a negative carrier.

In FIG. 2, curve B is a characteristic curve obtained when an experiment was conducted by providing the diaphragm mechanism 40 on the light source side of the light diffuser box 16. As is shown in FIG. 11, this characteristic is substantially the same as that obtained when the filter provided with the dielectric multilayer film was arranged on the light diffuser plate 17. Among rays diffused by the light diffuser box 16 and light diffuser plate 17, those having a large incident angle to the GR-limiting filter b are excluded by the negative film carrier 10 and lens 28 (see FIG. 28). In this case, a wavelength shift of 15 nm took place toward the shorter wavelength side. However, the deterioration of the effects of the BG-limiting filter is smaller compared to curve A. As is understood from this characteristic too, rays whose incident angles are different substantially are cut off in this embodiment, so that inconvenience such as that mentioned above can be reduced.

The rays entered the light diffuser box 16 are irradiated onto the negative film 14 by way of the light diffuser plate 17, GR-limiting filter b and ultraviolet cutoff filter c. Rays transmitted through the negative film 14 are measured by the two-dimensional color image sensor 26. At the two-dimensional color image sensor 26, a spectral sensitivity ditribution is formed by the color-light limiting means in such a way that it is identical to the effective sensitivity distribution of the color paper, i.e., the copying color-sensitive material 32 of the silver halide type. The measurement of the rays, which have transmitted through the negative film 14, by the two-dimensional color image sensor 26 indicates an exposure.

The light regulation filter 22 designed to include the cutoff wavelength end in the absorption wavelength band of the color-light limiting means is then inserted in the optical path so as to precisely conduct printing exposure of the color paper 32. The light regulation filter 22 may be designed to have the characteristic shown in FIG. 14(C) which will be described subsequently. Incidentally, the blue sensitivity of the color paper 32 has, in addition to an inherent sensitivity peak, a second sensitivity peak on the side of wavelengths longer than those corresponding to the inherent sensitivity peak, in other words, in a wavelength range close to the wavelength range overlapped with those corresponding to the green sensitivity. In this embodiment, a transmittance curve defining the shorter absorption wavelength end and longer absorption wavelength end of the BG-limiting filter a is specified in such a way that the rays of wavelengths corresponding to the second sensitivity peak are not cut off but at least the green sensitivity in the wavelength range overlapped between the spectral absorption distribution of the yellow pigment of the color film and the green sensitivity distribution of the copying color-sensitive material is cut off to a substantial extent (see FIG. 15). This allows to improve the color reproducibility of a color paper without any substantial reduction in the blue sensitivity.

As has been described above, the diaphragm mechanism 40 is arranged on the incident side of the light diffuser box 16 to exclude rays which have a large incident angle to the color-light limiting means and are prone to a wavelength shift upon reflection by the color-light limiting means. Color light is hence limited precisely, whereby the color reproducibility can be improved without reducing the sensitivity of the copying color-sensitive material to any substantial extent. In addition, it is also possible to bring the effective spectral sensitivity distribution of the color paper 32 and the spectral sensitivity distribution of the photometer including the two-dimensional color image sensor 26 into conformity with such a high accuracy as not available to date. This facilitates printing of various negative films under the same printing conditions.

As a filter coated with a dielectric multilayer film and having a narrow band-stop half-value width, there is a filter having a half-value width of about 20 nm. When rays having an incident angle distribution of from 0° to 25° and an equal light-quantity distribution enter the above filter coated with the dielectric multilayer film, the half-value width changes from about 20 nm to about 40 nm and the minimum transmittance increases by about twofold. It is however still possible to bring about effects as sought by the present invention, provided that a filter is designed while taking the foregoing into consideration in advance. Incidentally, when the incident angle range is controlled to 15° and smaller as in the present embodiment, the half-value width changes from about 20 nm to about 30 nm so that the increment in the minimum transmittance is minimized.

Figure 7:
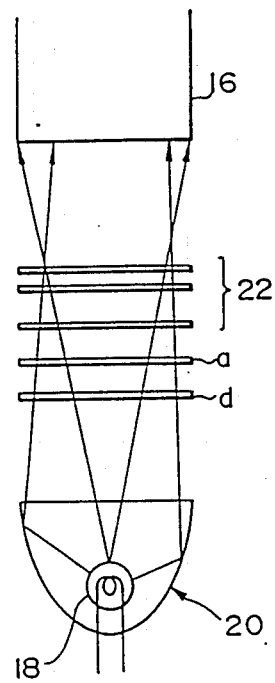
FIG. 7 is an enlarged fragmentary view of the printer of FIG. 1, in which a lamp house having a parabolic inner mirror surface has been applied as a guide means.

In the above-described embodiment, the diaphragm mechanism 40 capable of excluding unnecessary rays is applied as the guide means by way of example. The color-light limiting means is arranged in opposition to the incident side of the color original as shown in FIG. 11. Light emitted from the halogen lamp 18 can however be used in its entirety for the control of exposure without need for partial exclusion thereof provided that the reflector surface of the lamp house 20 is formed like a parabolic surface to reflect the light as rays substantially parallel to the optical axis as shown in FIG. 7.

Figure 8:
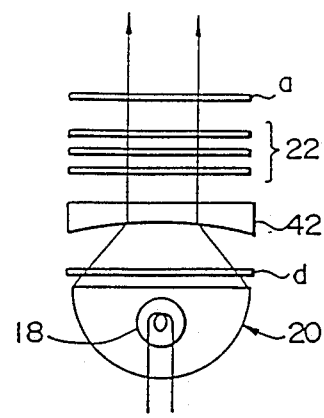
FIG. 8 is an enlarged fragmentary view of the printer of FIG. 1, in which a concave lens has been applied as a guide means.

As an alternative, it is also possible to interpose the concave lens 42 at a point downstream of the infrared cutoff filter d as illustrated in FIG. 8, whereby rays emitted from the halogen lamp 18 can be converted substantially into parallel rays by making use of the reflection of the former rays through the concave lens 42.

Figure 9:
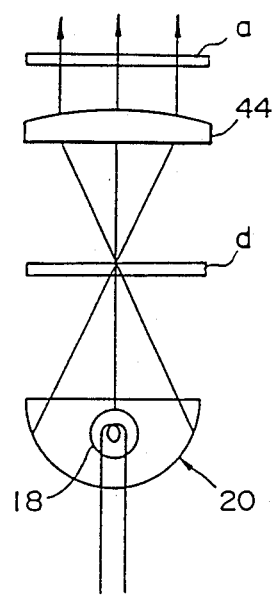
FIG. 9 is an enlarged fragmentary view of the printer of FIG. 1, in which a plano-convex lens has been applied as a guide means.

In FIG. 2, curve C is a characteristic curve obtained when, as illustrated in FIG. 8, rays were converted into parallel rays, followed by their entrance into the filter with the dielectric multilayer film vacuum-deposited thereon. In this case, the wavelength shift toward the shorter wavelength side is not greater than 10 nm and the difference in transmittance between the reflection band and transmission band is greater than the corresponding differences indicated by curves A and B respectively. The characteristic indicated by curve C is therefore different only a little from the characteristic of FIG. 15. In this case, the plano-convex lens 44 can also be applied by making combined use of the reflection angle of the inner mirror surface of the lamp house 20 as depicted in FIG. 9.

When it is desired to obtain parallel rays by a lens, this may be achieved by coating a lens with an infrared cutoff film on a side facing the light source and with a band-stop dielectric multilayer film on the reverse side to form an infrared cutoff filter and an band-stop filter as an integral unit. On the other hand, in an optical system of the construction that light is condensed by two plano-convex lenses, a filter coated with a band-stop dielectric multilayer film may be arranged between the plano-convex lenses.

Figure 10:
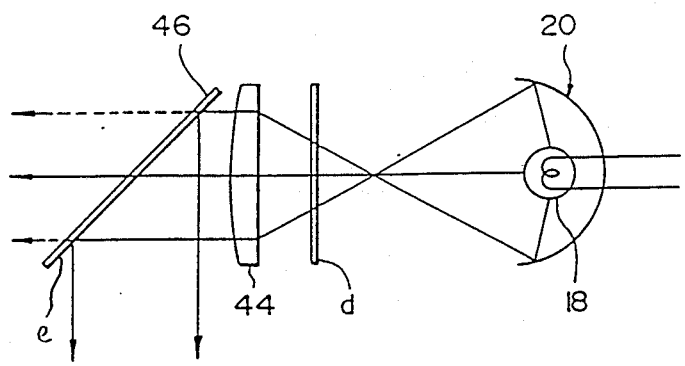
FIG. 10 schematically illustrates transmission of rays by a mirror coated with a dielectric multilayer film, said rays having a wavelength in a band-stop range.

Although the BG-limiting filter a is constructed by a filter, it may be replaced by mirror coated with a dielectric multilayer film e of the same characteristic as the BG-limiting filter as shown in FIG. 10, namely, by a mirror 46 coated with a dielectric multilayer film.

In the above embodiment, the diaphragm mechanism is attached to the light diffuser box. This is however not essential. As an alternative, the light diffuser box may be designed to serve as a diaphragm mechanism too, so that the light diffuser box can function to exclude unnecessary rays.

As is understood clearly from the present embodiment too, it is necessary to take into account the spectral wavelength shift of the color-light limiting filter. A wavelength shift takes place even in the above-mentioned optimum case, although it is limited to a certain small extent. Namely, it is necessary to use the sum of the maximum overlapping wavelength of two pigments of a negative film, a correction value for a wavelength shift of the color-light limiting filter caused by a temperature change and a correction value for a wavelength shift of the color-light limiting filter by the incident angle distribution of light as either the central wavelength or the minimum transmission wavelength of the filter. This consideration has not been disclosed by the prior art. A filter without this correction cannot bring about the intended effects or can show the effects only to extents reduced considerably.

When a filter provided with a dielectric multilayer film is arranged between a light source and a light diffusing means, light emitted from the light source must be converted into a parallel luminous flux. For this purpose, it may be necessary in some instances to change the optical system or to enlarge various filters compared to those employed when a converging light source is used. When the above optical system is not provided, the incident angle distribution of light is so broad that the spectral transmittance characteristic of the color-light limiting filter deteriorates, for example, the difference in transmittance between the transmission band and the reflection band may be reduced to $\frac{1}{3}$ or smaller of the corresponding difference in the filter in some instances, or in certain cases, the effects of the color-light limiting filter may be lost completely. In addition, development of color irregularity that the color is different between the central area and the peripheral area may be observed depending on the incident angle. Changes in spectral characteristics due to thermal effects may also take place.

When a filter provided with a dielectric multilayer film is arranged between the light diffuser means and the color photograph film, a color-light limiting filter of a large size may be required depending on the size of the color photograph film because when parallel rays are not used, the incident angle distribution of light to the dielectric multilayer film differs between the central area and the peripheral area to cause color irregularity. It is difficult to fabricate filters of uniform characteristics in view of their fabrication process, for example, due to uneven coating or the like. If one dares to fabricate such filters, an enormous cost increase is unavoidable. Further, there is a need for the replacement of the filter provided with the dielectric multilayer film whenever the film size changes. The filter may be broken or otherwise damaged upon the above replacement. Such replacement is therefore not preferred With the foregoing in view, an optical member coated with a dielectric multilayer film for cutting off light in a specific wavelength band of the visible range is arranged in the vicinity of the lens 28 of the color photograph printer according to another embodiment to be described hereinafter. FIG. 12(A) illustrates the color photograph printer of said another embodiment. Elements of structure corresponding to those illustrated in FIG. 1 are indicated by like reference symbols and their description will be omitted. This embodiment also uses BG-limiting dielectric multilayer film and GR-limiting dielectric multilayer film of the same characteristics as the BG-limiting filter a and GR-limiting filter b described above in the former embodiment. These dielectric multilayer films will hence be described by identifying them by letters a,b respectively.

As shown in FIG. 12(A), arranged in order above the negative film 14 are an optical system 29 formed of a master lens 28 and a detachable attachment lens 28B as the optical member of this embodiment. Rays which have transmitted through the light regulation filter 22, light diffuser box 16 and negative film 14 subsequent to their emission from the lamp house 20 are focused on the color paper 32 by an optical system 29. Like the former embodiment, a copying color-sensitive material of the silver halide type is used as the color paper 32 in this embodiment.

Figure 12B:
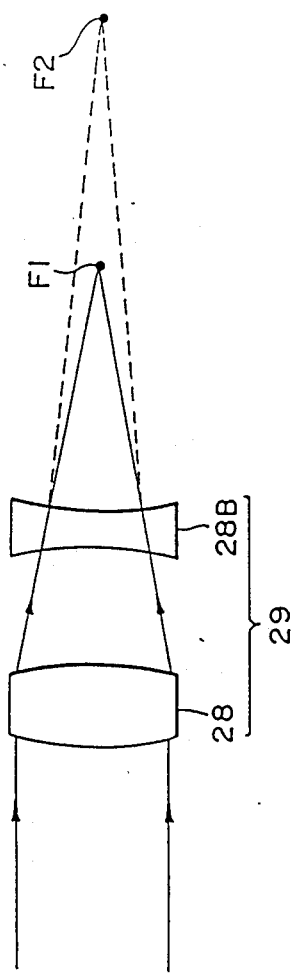
FIG. 12(B) illustrates a mask lens and its vicinity area on an enlarged scale.

An attachment lens 28B is arranged on the downstream side of the master lens 28 as illustrated in FIG. 12(B). Owing to its arrangement in the vicinity of the master lens, the attachment lens 28B can be used as an auxiliary lens which is used to change the focal distance or to change or control the enlargement. As the attachment lens 28B, a convex lens or concave lens is generally used (a concave lens is applied in this embodiment.).

Band-stop dielectric multilayer films a,b of different characteristics are vacuum-deposited on both surfaces of the attachment lens 28B respectively.

The dielectric multilayer film a serves to limit rays of B-sensitivity long wavelengths and G-sensitivity short wavelengths, while the dielectric multilayer film b acts to limit G-sensitive long wavelength rays and R-sensitive short wavelength rays. The ultraviolet cutoff filter c is arranged above the light diffuser box 16, while the infrared cutoff filter d is disposed between the lamp house 20 and the light regulation filter 22. The color-light limiting means is composed by these filters c,d and the above-described dielectric multilayer films a,b. G-light is formed by the combination of the BG-limiting dielectric multilayer film a and the GR-limiting dielectric multilayer film b, and R-light is formed by the combination of the infrared cutoff filter d and GR-limiting dielectric multilayer film b. Incidentally, it is not always required to use two types of band-stop dielectric multilayer films at the same time. It is hence possible to coat only one of the surfaces of the attachment lens 28B with the multilayer film. Although the effects of this invention may be reduced partly in such a case, the overall effects are still greater than any conventional techniques. It is also feasible to compensate the thus-reduced effects by other means. Instead of forming R-light and B-light by the ultraviolet cutoff filter c and infrared cutoff filter d, short and long wavelength cutoff filters may be used additionally for B-light and R-light respectively.

As examples of the BG-limiting and GR-limiting dielectric multilayer films in this embodiment, it is possible to use alternate $TiO_2$ and $SiO_2$ layers coated as several tens of layers by vacuum deposition.

The BG-limiting dielectric multilayer film a useful in the present embodiment will next be described with reference to FIGS. 14(A) through 14(C).

As illustrated in FIG. 14(A), the transmittance of the absorption peak wavelengths of the BG-limiting dielectric multilayer film a is 30% or lower, and its central wavelength exists around (within ±10 nm of) the wavelength (about 505 nm) at which the spectral absorption curve of the yellow pigment and that of the magenta pigment cross each other. Its half-value width is 15–50 nm in the case of the BG-limiting dielectric multilayer film a and 15–100 nm in the case of the GR-limiting dielectric multilayer film b. FIG. 14(B) illustrates by dashed lines the spectral sensitivity distribution of a color paper, which has been obtained as a result of cutoff of rays in a specific wavelength range. Solid lines indicate the actual spectral sensitivity distribution of the color paper. The BG-limiting dielectric multilayer film a has an absorption long wavelength end where the wavelength corresponding to one half of the maximum G sensitivity and the wavelength corresponding to one half of the transmittance of the BG-limiting dielectric multilayer film a are coincided substantially (within ±10 nm).

FIG. 14(C) shows the characteristics of the light regulation filter used in combination with the BG-limiting dielectric multilayer film a. The cutoff wavelength end of the light regulation filter is contained in the absorption wavelength band of the BG-limiting dielectric multilayer film a. As a result, even when two or more light regulation filters are inserted into the optical path at the same time, each of the thus-inserted light regulation filters can still exhibit its ideal characteristics without being affected by the other light regulation filter or filters because the rays in the wavelength band where the spectral transmittance varies due to overlapping of the spectral distributions have been eliminated. It is particularly difficult to fabricate a magenta filter which is supposed to have a narrow range of cutoff wavelengths. This difficulty can however be obviated by using the BG-limiting dielectric multilayer film a.

As a result, it is possible to solve the problem of absorption or leakage of rays inconvenient for the spectral characteristics of each light regulation filter. Precise control of exposure was not feasible by the spectral characteristics of conventional light regulation filters, which were designed based on the spectral sensitivity distribution of a color paper. By the way, dielectric multilayer films can also be applied to color-light cutoff filters instead of light regulation filters. Accordingly, they will be called "color-light control filters" collectively. The color-light control filters and the light diffuser means may be arranged relative to one another in various ways.

FIG. 15 is referred to again, in which the exemplary transmittance curve at short and long absorption wavelength ends which constitute absorption bands of the BG-limiting filter a is illustrated in detail. As already described above, the fall-starting wavelength in the short absorption wavelength end is about 470 nm, while the rise-ending wavelength in the long absorption wavelength end is approximately 530 nm. The transmittance change ΔT is as much as 40% or even greater per 10 nm. As a result, the second peak sensitivity of the blue-sensitive layer and the peak sensitivity of the green sensitivity are not reduced so that they can be separated without failure.

A description will next be made of filters (B-filter, G-filter and R-filter) which may be used by way of example for the two-dimensional color image sensor 26 in this embodiment.

B-Filter:

The B-filter has a transmittance long wavelength end in the absorption band of the BG-limiting dielectric multilayer film a or a wavelength range close to (within ±10 nm of) the absorption band or a transmittance long wavelength end close to (within ±10 nm of) the long wavelength end of the B-sensitivity distribution of a copying color-sensitive material.

G-Filter:

The G-filter has a transmittance short wavelength end in the absorption band of the BG-limiting dielectric multilayer film a or a wavelength range close to (within ±10 nm of) the absorption band and a transmittance long wavelength end in the absorption band of the GR-limiting dielectric multilayer film b or close to (within ±10 nm of) the absorption band or a transmittance long wavelength end close to (within ±10 nm of) the long wavelength end of the G-sensitivity distribution of the copying color-sensitive material.

R-Filter:

The R-filter has a transmittance short wavelength end in the absorption band of the GR-limiting dielectric multilayer film b or in a wavelength range close to (within ±10 nm of) the absorption band.

The operation of the present embodiment will be described hereinafter.

Light emitted from the halogen lamp 18 is irradiated onto the negative film 14. Rays transmitted through the negative film 14 are measured by the two-dimensional color image sensor 26 to determine the exposure.

The light regulation filter 22 designed to include the cutoff wavelength end in the absorption wavelength band of the color-light limiting means is then inserted in the optical path so as to precisely conduct printing exposure of the color paper 32. Incidentally, the blue sensitivity of the color paper 32 has, in addition to an inherent sensitivity peak, a second sensitivity peak on the side of wavelengths longer than those corresponding to the inherent sensitivity peak, in other words, in a wavelength range close to the wavelength range overlapped with those corresponding to the green sensitivity. In this embodiment, a transmittance curve defining the shorter absorption wavelength end and longer absorption wavelength end of the BG-limiting dielectric multilayer film a is specified in such a way that the rays of wavelengths corresponding to the second sensitivity peak are not cut off but at least the green sensitivity in the wavelength range overlapped between the spectral absorption distribution of the yellow pigment of the color film and the green sensitivity distribution of the copying color-sensitive material is cut off to a substantial extent [see FIG. 14(A) through FIG. 15]. This allows to improve the color reproducibility of a color paper without any substantial reduction in the blue sensitivity. Table 2 shows pigment color mixing ratios when the BG-limiting dielectric multilayer film was used.

TABLE 2

| Printing density | Pigment | | |
|---|---|---|---|
| | C | M | Y |
| R density (Dr) | 1.00 | 0.09 | 0.00 |
| G density (Dg) | 0.06 | 1.00 | 0.08 |
| B density (Db) | 0.00 | 0.06 | 1.00 |

As is demonstrated in Table 2, the present embodiment allows to lower the Dg density of the yellow pigment and the Db density of the magenta pigment, whereby more ideal transmission of color information fro a color photograph to a color paper is feasible. Owing to this, the color reproducibility of yellow and green has been improved. It is thus preferable to set Dg for the yellow pigment at 0.15 or smaller. For this purpose, it is necessary to reduce the 500–510 nm sensitivity of the green-sensitive layer to at least one half. Furthermore, it is also desirable to set Dg for the yellow pigment at 0.10 or smaller.

The color reproducibility can be improved by vacuum-depositing BG-limiting dielectric multilayer film and GR-limiting dielectric multilayer film, which are similar to those employed in the above embodiment, on the attachment lens 28B, reducing the reduction of the transmittance of rays in the B-sensitive long wavelength end and significantly lowering the sensitivity at least in a range of 500–510 nm of the G-sensitivity spectral distribution. Further, the rays emitted from the master lens 28 are close to parallel rays and are little affected by the distribution of their incident angles to the dielectric multilayer films a,b. In the present embodiment, the incident angles are not greater than 10°. It is also feasible to reduce the areas of the dielectric multilayer films a,b, so that color irregularity due to uneven coating or differences in incident angle to the filter can be avoided. Although the attachment lens 28B is arranged at a point downstream of the master lens 28 in this embodiment, the attachment lens 28B may of course be disposed on the side upstream of the master lens 28.

In this embodiment, the attachment lens 28 is used as the optical member and the dielectric multilayer films a,b are vacuum-deposited on both surfaces of the attachment lens 28B respectively. They may however be vacuum-deposited on the surfaces of the master lens 28 or on the surfaces of one of a group of lenses which make up the master lens 28. It is however easy and economical to coat the attachment lens 28B with these films. It is also feasible to form a filter coated with dielectric multilayer films by using an additional transparent glass plate as the optical member and then coating the transparent glass plate with the dielectric multilayer films.

Figure 16:
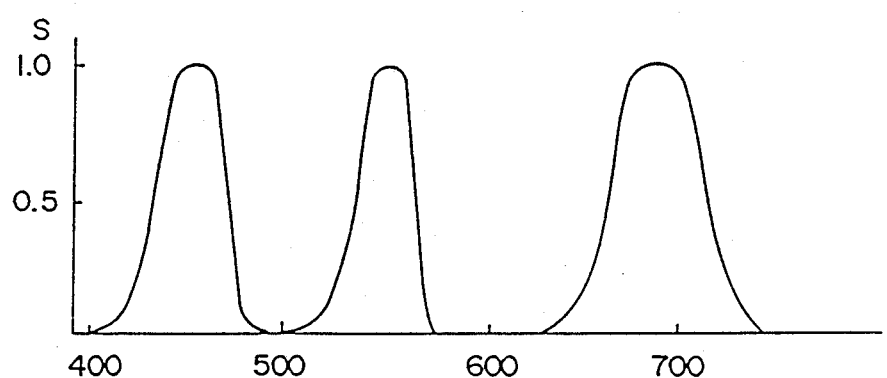
FIG. 16 is a characteristic diagram of the transmittance of a color separation filter which may be provided in the vicinity of a lens of a light-measuring system.

The spectral sensitivity distribution of the light measuring system can be controlled as shown in FIG. 16 by arranging a lens or filter coated with dielectric multilayer films of the same characteristics as those mentioned above in the vicinity of the light-measuring lens disposed on the upstream side of the two-dimensional color image sensor 26, so that the spectral sensitivity distribution of the light measuring system and that of the exposure system can be brought into conformity. Since the color separation filter whose characteristics are symmetrical with respect to the central wavelength as shown in FIG. 16 can be easily fabricated by an organic filter or dielectric multilayer films, it is used in the light-measuring system.

The above embodiments have each been described by using the color photograph printer for printing an image from a color film to a color paper. However, they can also be used, for example, to print an image from a color paper to another color paper, from a color paper to a color film. In general, they can be applied to color copying machines which can be used to copy an image from a color original (color photograph, color print or the like) to any copying color-sensitive material having three photosensitive ranges such as a recording material for an overhead projector (OHP), a color-sensitive material of the silver salt type or an electrophotographic sensitive material. They can be applied to the scanning exposure system in much the same way as to the surface exposure system. In particular, the application of the present invention to a copying machine of the scanning exposure system making use of a photographic sensitive material is extremely effective for the improvement of the color reproducibility and original dependency. In the above description, the color-light regulator filters or color-light limiting means are arranged at right angles to the optical path. The present invention however embraces the use of mirrors arranged at an angle other than 90°, for example, at 45° so as to use rays reflected by them.

What is claimed is:

1. A color image exposure apparatus for obtaining a color picture from a color original, comprising:
   a color-light limiting means arranged in an optical path of light emitted from a light source and provided with a dielectric multilayer film for limiting color light around at least a wavelength band in which a blue light wavelength range and a green light wavelength range overlap;
   an exposure control means having yellow, magenta and cyan color-light control filters for color light which has transmitted through or has been reflected by the color-light limiting means and has transmitted through or has been reflected by the color original, said filters being inserted in the optical path to control the exposure of each of three primary-color-sensitive layers in a copying color-sensitive material; and
   a guide means for irradiating, as copying light, only those rays having an angle in a predetermined range relative to an optical axis of the light source out of rays transmitted through or reflected by the color-light limiting means provided with the dielectric multilayer film.

2. A color image exposure apparatus as claimed in claim 1, wherein the guide means is a diaphragm member for cutting off peripheral rays of the rays transmitted through or reflected by the color-light limiting means provided with the dielectric multilayer film.

3. A color image exposure apparatus as claimed in claim 1, wherein the guide means is a lens and the light emitted from the light source is reflected by the lens into substantially parallel rays.

4. A color image exposure apparatus as claimed in claim 1, wherein the guide means is a mirror and the light emitted from the light source is converted into substantially parallel rays by the mirror.

5. A color image exposure apparatus as claimed in claim 1, wherein the band of wavelengths transmitted through or reflected by the dielectric multilayer film is corrected on the basis of the angle distribution of rays transmitted through or reflected by the color-light limiting means provided with the dielectric multilayer film.

6. A color image exposure apparatus as claimed in claim 1, wherein the color-light limiting means provided with the dielectric multilayer film is a filter coated with a dielectric multilayer film.

7. A color image exposure apparatus as claimed in claim 1, wherein the color-light limiting means provided with the dielectric multilayer film is a mirror coated with a dielectric multilayer film.

8. A color image exposure apparatus as claimed in claim 1, wherein the color-light limiting means comprises:
   a first filter provided with a dielectric multilayer film for limiting transmission of color light around the wavelength band in which the blue light wavelength range and the green light wavelength range overlap;
   a second filter for limiting transmission of ultraviolet rays; and
   a third filter for limiting transmission of infrared rays.

9. A color image exposure apparatus as claimed in claim 8, further comprising:
   a fourth filter provided with a dielectric multilayer film for limiting transmission of color light around a wavelength band in which the blue light wavelength range and a red light wavelength range overlap.

10. A color image exposure apparatus as claimed in claim 9, wherein the first filter and third filter are arranged between a light diffuser box provided in the color image exposure apparatus and the light source while the second filter and fourth filter are disposed between the light diffuser box and the color original.

11. A color image exposure apparatus as claimed in claim 3, wherein the lens is coated on the surface facing the light source with an infrared cutoff film for limiting transmission of infrared rays and its reverse surface with a dielectric multilayer film for limiting transmission of the color light around the wavelength band in which the blue light wavelength range and the green light wavelength range overlap.

12. A color image exposure apparatus as claimed in claim 1, wherein the color-light limiting means is provided in opposition to the color original so that the rays transmitted through or reflected by the color-light limiting means provided with the dielectric multilayer film may be irradiated into the color original.

13. A color image exposure apparatus for obtaining a color picture from a color original, comprising:

a color-light limiting means arranged in an optical path of light emitted from a light source;

an exposure control means for inserting color-light control filters into the optical path in accordance with measurement data of color light which has been transmitted through or has been reflected by the color-light limiting means and has been transmitted through or has been reflected by the color original, whereby the light is irradiated through a lens onto a copying color-sensitive material to control the exposure of each of three primary-color-sensitive layers in the copying color sensitive material; and an optical member coated with a dielectric multilayer film for cutting off rays in a particular wavelength band of a visible range and arranged in the vicinity of the lens.

14. A color image exposure apparatus as claimed in claim 13, wherein the optical member is a detachable auxiliary lens arranged in the vicinity of the lens to permit adjustment of focal distance.

15. A color image exposure apparatus as claimed in claim 13, wherein the color-light limiting means comprises:

another dielectric multilayer film for limiting transmission of color light around a wavelength band in which a blue light wavelength range and a green light wavelength range overlap;

a second filter for limiting transmission of ultraviolet rays; and a third filter for limiting transmission of infrared rays.

16. A color image exposure apparatus as claimed in claim 15, further comprising:

a further dielectric multilayer film for limiting transmission of color light around a wavelength band in which the blue light wavelength range and a red light wavelength range overlap.

17. A color image exposure apparatus as claimed in claim 13, wherein the dielectric multilayer film for cutting off the rays in the particular wavelength band of the visible range includes a dielectric multilayer film for limiting transmission of color light around a wavelength band in which a blue light wavelength range and a green light wavelength range overlap.

18. A color image exposure apparatus as claimed in claim 17, further comprising another dielectric multilayer film for limiting transmission of color light around a wavelength band in which the blue light wavelength range and a red light wavelength range overlap.

* * * * *